United States Patent Office 3,275,629
Patented Sept. 27, 1966

3,275,629
SUBSTITUTED ARYLOXYALKYLENE AMINES
Manuel M. Baizer, St. Louis, Mo., assignor to Monsanto Company, a corporation of Delaware
No Drawing. Filed Mar. 20, 1963, Ser. No. 266,494
7 Claims. (Cl. 260—247.7)

This invention relates to halogenated aryloxyalkylene amines as new and useful compositions of matter. This invention further relates to a process for preparing halogenated aryloxyalkylene amines, which process comprises a series of reactions which will subsequently be described in detail.

It is an object of this invention to provide aryloxy-$\beta$-halo-alkylene amine hydrohalides as new compositions of matter.

It is a further object of this invention to provide aryloxy-$\beta$-halo-alkylene amines as new compositions of matter.

It is a still further object of this invention to provide a process for the preparation of aryloxy-$\beta$-halo-alkylene amines. Additional objects, benefits, and advantages will become apparent as the detailed description of the invention proceeds.

Compounds according to the present invention may be represented by the following generic formula:

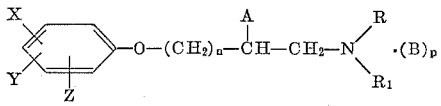

wherein X, Y, and Z are hydrogen, halogen, nitro, or lower alkyl radicals; where A is a halogen radical; where R and $R_1$ are alkyl, cycloalkyl, alkenyl, aryl, alkaryl, or aralkyl radicals, or are joined to form a heterocyclic ring; where B is a hydrohalide; where $n$ is an integer from 1 to 4; and where $p$ is 0 or 1.

The $\beta$-halogenated aryloxyalkylene amines encompassed within the scope of this invention may contain an unsubstituted phenyl radical attached to the oxyalkyl group, as for example 1-diethylamino-2-chloro-3-phenoxy-propane. The present invention also includes compounds containing substituents on the aromatic ring in either the ortho, meta, or para position. Furthermore, combinations of ortho and meta, ortho and para, meta and para, and ortho, meta and para substitutions are within the scope of this invention, as well as di-ortho and di-meta combinations. These substitutions on the ring may consist of halogen atoms, particularly chlorine, or nitro radicals, and of lower alkyl radicals such as methyl, ethyl, n-propyl, isopropyl, n-butyl, isobutyl, sec-butyl, tert-butyl, n-amyl, isomeric amyl, n-hexyl, and isomeric hexyl radicals. In addition, mixed substitutions on the aromatic ring such as 3-nitro-4-chloro and 2-methyl-4-bromo provide compounds within the scope of this invention. Preferred substitutents on the aromatic ring include chloro, nitro, methyl, and ethyl radicals. Common and easily prepared substitutions on the aromatic ring comprise 2,4; 2,6; and 2,4,6 combinations. Compounds illustrative of these many possible substitutions include:

1-dicyclohexylamino-2-chloro-3-(2,4-dichlorophenoxy) propane;
1-dicyclohexylamino-2-chloro-3-(o-tolyloxy)propane;
1-dicyclohexylamino-2-chloro-3-(3-nitro-4-bromo-phenoxy)propane; and
1-dicyclohexylamino-2-chloro-3-(p-isopropylphenyloxy) propane.

The alkylene group, —$(CH_2)_n$— in the generic formula can be varied from a methylene linkage up to a four carbon chain. Preferred alkylene groups are methylene and ethylene. Examples of such variation include: 1-diethylamino-2-chloro-4-(2,4-dichlorophenoxy)butane and 1-diethylamino-2-chloro-6-(2,4-dichlorophenoxy)hexane.

The substituents on the nitrogen atom, R and $R_1$ in the generic formula, can be alkyl, cycloalkyl, alkenyl, aryl, alkaryl, or aralkyl radicals, preferably containing not more than eight carbon atoms, and more preferably not more than 7 carbon atoms. These radicals may be either straight- or branch-chained and the R and $R_1$ may be either identical or different. Examples of suitable compounds include:

1-(N-benzyl, N-tert-butyl)amino-2-chloro-3-phenoxy propane;
1-diallylamino-2-chloro-3-phenoxy propane;
1-divinylamino-2-chloro-3-phenoxy propane;
1-(N-ethyl, N-phenyl)amino-2-chloro-3-phenoxy propane;
1-(N-isopropyl, N-p-tolyl)amino-2-chloro-3-phenoxy propane; and
1-diisopropylamino-2-chloro-3-phenoxy propane.

The R and $R_1$ groups can also be joined to form a heterocyclic ring. Examples of such compounds include: 1-(4-morpholino)-2-bromo-3-phenoxy propane and 1-piperidino-2-bromo-3-phenoxy propane.

The A substituent in the generic formula is a halogen atom, preferably a chlorine or bromine atom, and more preferably a chlorine atom, although fluorine- and iodine-substituted compounds are definitely within the scope of this invention. Examples of such compounds are:

1-diallylamino-2-bromo-3-phenoxy propane;
1-diallylamino-2-iodo-3-phenoxy propane; and
1-diallylamino-2-fluoro-3-phenoxy propane.

The examples previously given to demonstrate variations of A, as well as the examples given to demonstrate variations of X, Y, Z, R, and $R_1$, have all been aryloxy-$\beta$-halo-alkylene amines. Also included within the scope of this invention are the hydrohalides of such compounds, wherein the hydrohalide contains a halogen atom usually corresponding to the $\beta$-halogen on the alkylene radical connecting the aryloxy and amino substituents. Rather than repeat unnecessarily numerous compounds exemplifying the aryloxy-$\beta$-halo-alkylene amine hydrohalides, it is my intent to apply all the previous combinations of X, Y, Z, R, and $R_1$ to this closely related class of compounds. Representative examples of these two classes of compounds include: 1-(4-morpholino)-2-chloro-3-phenoxy propane hydrochloride; 1-diallylamino-2-fluoro-4-phenoxy butane hydrofluoride; and 1-dicyclohexylamino-2-chloro-3-(3,4-dichlorophenoxy)propane hydrochloride.

The general method used in the preparation of the compounds of this invention proceeds as follows:

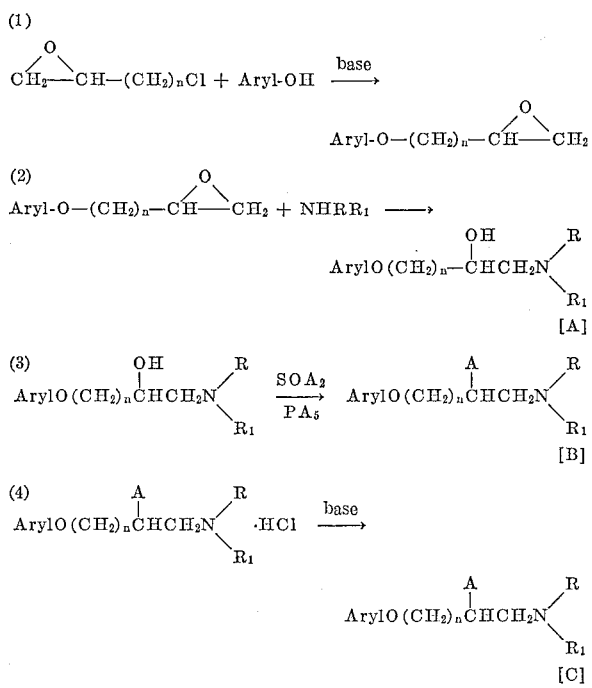

A chloro-aryloxyalkylene epoxide is reacted in a basic medium with a phenol which may be substituted with the previously defined X, Y, and Z groups to form an aryloxyalkylene epoxide. The product thus formed is then reacted with an amine substituted with the desired R and $R_1$ groups. Preferably the amine is added slowly with stirring to control the exothermic reaction.

The product formed is the aryloxy-β-hydroxyalkylene amine designated [A] in the equations above. This material may then be dissolved in some suitable anhydrous solvent such as benzene and further reacted with an inorganic acid halide, preferably a thionyl halide, phosphorous trihalide or phosphorous pentahalide. This inorganic acid halide may also be dissolved in the solvent chosen for the amine if desired. The use of a solvent for this reaction is not indispensable; it is utilized to insure a controlled and uniform reaction and may be omitted if desired. To further insure a complete reaction, I have found it desirable to reflux the reaction mixture for one or more hours. Following this reflux, the crystallized precipitate is filtered, washed with solvent, and dried. The compounds of this invention have required varying degrees of purification at this point of the process. Those skilled in the art will be aware of various methods to achieve a purified product and I will also describe in detail in the subsequent examples those methods which I have found useful. The product of this reaction, an aryloxy-β-haloalkylene amine hydrohalide designated [B] in the equations above is then dissolved in water. The solution is then treated with some alkaline material such as $NH_4OH$, $Na_2CO_3$, $NaHCO_3$, NaOH, etc. to precipitate the liberated haloamine designated [C] in the above equations. This precipitate may be filtered, washed and dried; or the precipitate may be dissolved in a water-immiscible solvent and the layers separated. Alkyl ethers are suitable solvents for this purpose. If an ether solvent is used, the ether is subsequently evaporated and the sample dried over a desiccant. This later procedure permits additional yield since the water layer may be re-extracted with the solvent to remove additional amine.

The advantages and benefits of the present invention will become more fully understood when interpreted in view of the detailed description set forth in the following examples.

*Example I*

A quantity of 43.5 grams of morpholine was added slowly with stirring to 75.0 grams of phenyl-glycid ether. The temperature of the reactant mixture rose slowly to 80° C. and was maintained around 80–100° C. for one hour. A vacuum was then applied and 1.4 grams of volatile material was removed at 80° C. and 10 mm. Hg. A quantity of 5.0 grams of the product, designated A which was 1-(4-morpholino)-2-hydroxy-3-phenoxy propane, was removed for testing and the remainder was dissolved in 175 ml. hot dry benzene, which was then cooled to room temperature. To this solution 59.1 grams of $SOCl_2$ in 50 ml. benzene was added slowly with stirring. The mixture was cooled to maintain the temperature below 30° C. Following the addition of $SOCl_2$, the cooling was removed and the mixture heated to reflux temperature for four hours. After standing at room temperature overnight, the mixture was filtered and the tarry precipitate was washed with benzene and ether and then dried. Weight of the brown solid was 122.3 grams. Yield of the crude chlorinated amine hydrochloride was 89.3%. The brown solid was digested three times with 500 ml. ethyl acetate to extract the amine hydrochloride. The acetate liquors were chilled to crystallize the product and filtered. This product was then recrystallized from ethyl alcohol as an off-white solid with a melting point of 155-156° C. The insoluble residue from the ethyl acetate extractions was dissolved in hot ethyl alcohol, treated with activated charcoal which was then removed, chilled in an ice bath to crystallize the product, and filtered. The product was a very pale tan solid with a melting point of 155–157° C. These two products were then combined and recrystallized from ethyl alcohol. Weight of the final product was 70.2 grams which represented a 50.4% yield; melting point was 155–156° C.; analysis of the product, designated B which was 1-morpholino-2-chloro-3-phenoxy propane hydrochloride, was calculated as C=53.43%, H=6.62%, N=4.79%. Found C=53.15%, H=6.54%, N=4.83%. Ten grams of product B was then dissolved in 20 ml. water and cooled to 5–10° C. About 20–25 ml. ether was added and then concentrated $NH_4OH$ was added slowly with shaking. The liberated chloroamine settled into the ether layer where it dissolved. The ether layer was removed and the aqueous layer re-extracted with an additional 10 ml. ether. The ether solutions were combined, dried, and the ether removed under vacuum. Weight of the final product (designated C), 1-(4-morpholino)-2-chloro-3-phenoxy propane which was a pale amber syrup, was 8.4 grams which represented a 96.6% yield. Analysis of the product was: calculated C=61.05%, H=7.09%, N=5.49%. Found C=60.62%, H=7.08%, N=5.64%.

*Example II*

Reaction of t-butylamine and benzyl chloride yielded N-benzyl-t-butylamine. A quantity of 41.0 grams of this amine was added to 37.5 grams of phenyl-glycid ether and the mixture heated around 100° C. and stirred for about 6 hours. A yellow mass formed from which 6.8 grams of volatile material were removed at 108–126° C. and 22 mm. The residual material was dissolved in 75 ml. benzene and treated with a solution of $SOCl_2$ in benzene (18 ml. $SOCl_2$ in 50 ml. benzene). The reactant mixture was cooled during $SOCl_2$ addition to keep the temperature around 25–30° C. After addition the mixture was warmed to reflux temperature and maintained there for about 5 hours. After standing overnight at room temperature, the crystalline material was filtered, washed, dried, recrystallized from ethyl alcohol, and dried again. Weight of the white crystalline final product was 66.5 grams which represented a yield of 79.6%. Melting point was 158–159° C. Analysis of the product as calculated was: C=65.21%, H=7.39%, N=3.81%. Found C=64.87%, H=7.59%, N=3.84%.

A quantity of 8.0 grams of this product was treated with 10 ml. 10% NaOH according to the neutralization procedure described in Example I. Following removal of the ether solvent, the product was distilled at 134–144° C. at 0.075 mm. to collect a pale amber liquid. Calculated analysis was C=72.38%, H=7.90%, N=4.22%. Found: C=71.69%, H=8.51%, N=3.98%. The product was identified as 1-(N-benzyl, N-tert-butyl)amino-2-chloro-3-phenoxy propane.

*Example III*

A quantity of 16.9 grams of 1,2-epoxy-3-(2,4-dichloro)-phenoxy propane was prepared by reacting 81.5 grams of 2,4-dichlorophenol with 46.5 grams of epichlorohydrin in an aqueous 3% NaOH medium. The mixture was sealed and permitted to stand at room temperature for two weeks unattended except for occasional swirling. A semi-solid lower layer formed which was separated and dissolved in 700 ml. ether and dried over $CaSO_4$. The ether distilled off under vacuum and the residual material was distilled at 4 mm. through a six inch Vigreaux column. The 151–165° C. cut was the desired product. Calculated analysis was C=49.34%, H=3.68%, Cl=32.38%. Found C=48.97%, H=3.44%, Cl=31.79%.

A quantity of 13.9 grams of the product above was added to 4.64 grams of diethylamine. The mixture was stirred and refluxed for about 4 hours. When refluxing stopped, 2 ml. additional diethylamine was added and refluxing continued for one more hour. Excess diethylamine was removed by aspiration at 120° C. The residue was vacuum-distilled at 128° C. and 0.03 mm. to give 14.4 grams of the product. This represented a 77.5% yield. The product was an amber liquid with a boiling point of 128° C. at 0.03 mm. or 120° C. at 0.01 mm. Refractive index was $n_D^{25}$ 1.5322. Calculated analysis was C=53.41%, H=6.55%, Cl=24.27%. Found C=52.81%, H=6.64%, Cl=22.33%.

To 12.1 grams of this product dissolved in 100 ml. benzene, 5.2 grams of $SOCl_2$ in 25 ml. benzene was added slowly with stirring and cooling. After addition, the mixture was refluxed for about 4 hours, then permitted to stand overnight at room temperature. The chloroamine hydrochloride was extracted with water. To the aqueous solution ether was added, and the mixture made alkaline with ammonia to liberate the chloroamine. The ether portion was separated and the ether distilled off at 80° C. with the aid of an aspirator. The crude product was vacuum-distilled at 120–125° C. and 0.02–0.03 mm. to give 8.6 grams of purified 1-diethylamino-2-chloro-3(2,4-dichlorophenoxy)propane, which was a very pale yellow liquid. Refractive index was $n_D^{25}$ 1.5291; calculated analysis was C=50.27%, H=5.84%, Cl=34.23%. Found C=50.89%, H=6.24%, Cl=33.92%.

*Example IV*

The material 1-diallylamino-2-hydroxy-3-phenoxy propane was prepared by reacting 75.0 grams of phenylglycid ether with 41.5 grams of diallylamine according to the procedure described in Example II. After removal of volatile material, the crude product was distilled in a 6 inch Vigreaux column and the 118–128° C. (0.15–0.20 mm.) cut was collected. Weight of the product, which was a colorless liquid, was 111.6 grams which represented a 90.4% yield; refractive index was $n_D^{25}$ 1.5202; calculated analysis was C=72.59%, H=8.56%, N=5.73%. Found C=72.31%, H=8.66%, N=5.56%.

A quantity of 24.7 grams of this product was then reacted first with 12.5 grams of $SOCl_2$, and then with ammonia according to the procedure described in Example III. Weight of the liberated 1-diallylamino-2-chloro-3-phenoxy propane was 15.4 grams, which represented a yield of 58.0%. The product was an almost colorless liquid with a refractive index $n_D^{25}$ 1.5202. Calculated analysis was C=67.70%, H=7.51%, N=5.48%. Found C=67.16%, H=7.63%, N=5.48%.

*Example V*

A quantity of 45.0 grams of phenylglycid ether was reacted with 60.0 grams of dicyclohexylamine according to the procedure described in Example II to yield 90.7 grams of 1-dicyclohexylamino-2-hydroxy-3-phenoxy propane, which represented a 91.5% yield.

The product was then reacted with 35.7 grams of $SOCl_2$ according to the procedure described in Example II except that the product was recrystallized from acetone since the product was too soluble in ethanol. Weight of the product was 70.0 grams. Melting point was 148–149° C.; calculated analysis was C=65.2%, H=8.61%, Cl=18.36%. Found: C=65.81%, H=9.14%, Cl=18.26%.

About 35.0 grams of the chloroamine hydrochloride was suspended in ice-water to which 500 ml. ether had been added. This mixture was made alkaline with ammonia to liberate the chloroamine. The ether portion was dried over $Na_2SO_4$, and the ether removed by heating aspiration. The residual liquid partially crystallized upon standing for several days. The crystals were filtered, washed with Skellysolve F, and dried. Melting point was 46–48° C.; calculated analysis was C=72.07%, H=9.22%, Cl=10.13%. Found: C=71.12%, H=8.75%, Cl=10.07%.

*Example VI*

The product 1-dicyclohexylamino-2-chloro-3-(2,4-dichlorophenoxy)propane was prepared according to the procedure described in Example V except that 1,2-epoxy-3-(2,4-dichlorophenoxy)propane was used as a starting material instead of phenylglycid ether. The crude product was recrystallized from isopropanol. Melting point was 74–75° C.; calculated analysis was C=60.21%, H=7.22%, Cl=25.39%. Found: C=60.27%, H=7.91%, Cl=25.39%.

*Example VII*

A quantity of 22.5 grams of 1,2-epoxy-4-(3-nitro-p-tolyloxy)butane is prepared by reacting 8.0 grams of 1,2-epoxy butane with 15.5 grams of 3-nitro-4-methyl phenol in an aqueous 3% NaOH medium. The reactant mixture is sealed and permitted to stand unattended for 10 days except for occasional swirling.

About 20.0 grams of the resulting purified product is reacted with 8.5 grams of piperidine and refluxed for 4–8 hours. The crude product, 1-piperidyl-2-hydroxy-4-(3-nitro-p-tolyloxy)butane, is purified by vacuum distillation as described in Example II.

The entire product is then dissolved in 100 ml. benzene and reacted with 8.6 grams of thionyl fluoride, $SOF_2$, dissolved in 50 ml. benzene. Polyethylene equipment should be used in this step and subsequent steps of the process to avoid reaction of the reactive fluoride with glassware. Following a 4–5 hour reflux, the mixture is permitted to stand overnight at room temperature. The product, 1-piperidyl-2-fluoro-4-(3-nitro-p-tolyloxy)butane hydrofluoride, is extracted with water, and the solution mixed with ether. The mixture is chilled and made alkaline with $NH_4OH$ to liberate the crude product, 1-piperidyl-2-fluoro-4-(3-nitro-p-tolyloxy)butane. The ether layer containing the crude product is separated from the aqueous layer and the ether is removed by heating with aspiration. The residue is crystallized from ethanol. Weight of the final purified product is 25.0 grams.

The aryloxy-β-halo-alkylene amines are useful as biological toxicants. The primary utility of these compounds is as a contact herbicide, many of them being preferentially active on dicotyledon, or broad-leaved, plant systems. In addition, some of the halogenated alkylene amines of this invention, for instance the dicyclohexylamine compounds, possess contact herbicidal activity on monocotyledon, or grass-type, plant systems as well as on dicotyledon systems. Growth-inhibiting concentrations of the compounds of this invention vary among the compounds; generally concentrations of 0.5% by weight or less of the compound is necessary, with some of the compounds such as 1-dicyclohexylamino-2-chloro-3-phenoxy propane, being herbicidally active in foliage contact applications of 0.01% by weight. Further a number of the compounds of this invention which have been tested have shown activity as pre-emergence herbicides, as agricultural fungicides, especially soil fungicides, and as soap bacteriostats. Pre-emergence activity is usually achieved at application rates of about 25 lbs. per acre. Effective control of soil fungi is usually achieved at soil concentrations of 30 p.p.m. The bacteria *Staphylococcus aureus*, *Salmonella typhosa*, and *Aspergillus niger* are effectively inhibited at concentration levels of these compounds varying from 1 part per thousand to 1 part per million, thus indicating utility as soap bacteriostats at concentrations of 1 part per thousand or less.

From the above discussion it is obvious that several of the aryloxy-β-halo-alkylene amines possess biological toxicant activity in two or more areas. Other amines of this invention not mentioned above will be active in at least one aspect of biological control.

The other class of compounds, the aryloxy-β-haloalkylene amine hydrohalides, are useful as intermediates in the preparation of the aryloxy-β-halo-alkylene amines of this invention.

Although the invention has been described in terms of specified embodiments which are set forth in considerable detail, it should be understood that this was done for illustrative purposes only and was not meant as an exhaustive summary, and that the invention is not necessarily limited thereto since alternative embodiments and operating techniques will become apparent to those skilled in the art in view of this disclosure. For instance, the process for the preparation of the aryloxy-β-halo-alkylene amines has been described as a four-step reaction. However, it is within the scope of this invention to combine this preparation with certain modifications into a two-step or one-step operation or into one continuous process wherein the appropriate reactants are added at suitable stages of the process. Accordingly, this modification and others are contemplated which can be made without departing from the spirit of the described invention.

What is claimed is:
1. A compound of the formula:

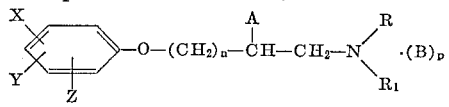

wherein X, Y, and Z are selected from the group consisting of hydrogen, halogen, nitro, and lower alkyl radicals; where A is a halogen radical; where R and $R_1$ are selected from the group consisting of alkyl, alkenyl, aryl, alkaryl, aralkyl having up to 8 carbon atoms, and when joined together, a heterocyclic selected from the group consisting of morpholino and piperidino; where B is a hydrohalide; where $n$ is an integer from 1 to 4; and where $p$ is an integer from 0 to 1.

2. 1-(4-morpholino)-2-chloro-3-phenoxy propane.
3. 1-(N-benzyl, N-tert-butyl)amino-2-chloro-3-phenoxy propane.
4. 1 - diethylamino - 2-chloro-3-(2,4-dichlorophenoxy) propane.
5. 1-diallylamino-2-chloro-3-phenoxy propane.
6. 1-dicyclohexylamino-2-chloro-3-phenoxy propane.
7. 1 - dicyclohexylamino - 2-chloro-3-(2,4-dichlorophenoxy)propane.

References Cited by the Examiner

UNITED STATES PATENTS

| | | | |
|---|---|---|---|
| 2,952,678 | 9/1960 | Lane | 260—570.7 |
| 3,033,640 | 5/1962 | Hofer et al. | 260—294.7 |
| 3,085,938 | 4/1963 | Berger et al. | 260—294.7 |
| 3,102,839 | 9/1963 | Neracher et al. | 260—294.7 |
| 3,178,420 | 4/1965 | Palopoli et al. | 260—570.7 |

FOREIGN PATENTS 297,704   6/1954   Switzerland.

OTHER REFERENCES

Fieser et al., Advanced Organic Chemistry (Reinhold Pub. Co., New York, 1961), pages 326 and 327.

WALTER A. MODANCE, *Primary Examiner.*

NICHOLAS S. RIZZO, JOHN D. RANDOLPH, ROBERT L. PRICE, AVROM D. SPEVACK,
*Assistant Examiners.*